United States Patent [19]
Richardson

[11] Patent Number: 5,974,536
[45] Date of Patent: *Oct. 26, 1999

[54] METHOD, SYSTEM AND COMPUTER PROGRAM PRODUCT FOR PROFILING THREAD VIRTUAL MEMORY ACCESSES

[75] Inventor: John L. Richardson, Santa Barbara, Calif.

[73] Assignee: Silicon Graphics, Inc., Mountain View, Calif.

[21] Appl. No.: 08/911,192

[22] Filed: Aug. 14, 1997

[51] Int. Cl.⁶ ............................... G06F 9/00; G06F 12/00
[52] U.S. Cl. ............................... 712/215; 711/6; 711/100; 711/150; 711/159
[58] Field of Search ............................... 711/6, 100, 150, 711/159; 712/215; 395/391

[56] References Cited

U.S. PATENT DOCUMENTS

| | | | |
|---|---|---|---|
| 5,247,676 | 9/1993 | Ozur et al. | 395/684 |
| 5,261,097 | 11/1993 | Saxon | 395/676 |
| 5,345,588 | 9/1994 | Greenwood et al. | 395/677 |
| 5,430,850 | 7/1995 | Papadopoulos et al. | 395/683 |
| 5,560,029 | 9/1996 | Papadopoulos et al. | 395/800.25 |
| 5,590,326 | 12/1996 | Manabe | 395/477 |
| 5,692,193 | 11/1997 | Jagannathan et al. | 395/676 |
| 5,717,926 | 2/1998 | Browning et al. | 395/674 |
| 5,745,703 | 4/1998 | Cejtin et al. | 395/200.68 |
| 5,752,031 | 5/1998 | Cutler et al. | 395/673 |

*Primary Examiner*—Krisna Lim
*Attorney, Agent, or Firm*—Sterne, Kessler, Goldstein & Fox, P.L.L.C.

[57] ABSTRACT

A method, system, and computer program product are provided for profiling virtual memory accesses by one or more threads. A virtual memory access thread profiling tool includes a histogram generator and a thread placement file generator. The histogram generator generates a histogram that indicates the relative frequency at which virtual memory addresses are accessed by each program thread. To generate the histogram, the histogram generator runs and interrupts each program thread to collect samples. When an interrupt is issued, a program counter is returned. A valid load or store instruction is determined for a thread in assembly code identified by the returned program counter. In one example, to determine a valid load or store instruction, the histogram generator walks forward or backward through the assembly code identified by the returned program counter until a valid load or store instruction is reached. A virtual memory address corresponding to a valid load or store instruction is then read. A histogram is then incremented based on the virtual memory address to track the relative frequency at which virtual memory addresses are accessed by each thread. Further options are provided to allow a user to control the virtual memory access profiling tool. These options include selecting and setting the type of collection method, selecting and setting program counter (PC) and memory address filtering, setting the sampling granularity, providing start/stop control, selecting real-time graphical histogram output, and naming output files. The virtual memory access thread profiling tool can be implemented as a profiling command executed by an operating system for a multi-processor system, such as, a NUMA machine.

50 Claims, 8 Drawing Sheets

```
tokyo% dprof simple
dprof initialization...
 npoints =          4096
niters =            100000
iteration           100000, error = 1.002341494068793
```

| address     | thread | reads | writes |
|-------------|--------|-------|--------|
| 0x10010000  | 3      | 0     | 3      |
| 0xfff9ffc000| 3      | 28    | 523    |
| 0xfffffe8000| 3      | 108   | 184    |
| 0xffffff0000| 3      | 179   | 61     |
| 0xffffff8000| 3      | 0     | 254    |
|             |        |       |        |
| 0xfffaffc000| 2      | 36    | 521    |
| 0xfffffe4000| 2      | 59    | 139    |
| 0xfffffe8000| 2      | 43    | 83     |
| 0xfffffec000| 2      | 106   | 30     |
| 0xffffff0000| 2      | 82    | 22     |
| 0xffffff4000| 2      | 0     | 106    |
| 0xffffff8000| 2      | 0     | 129    |
|             |        |       |        |
| 0x10010000  | 1      | 0     | 3      |
| 0xfffbffc000| 1      | 32    | 569    |
| 0xfffffe4000| 1      | 123   | 201    |
| 0xfffffec000| 1      | 188   | 49     |
| 0xffffff4000| 1      | 0     | 191    |
| 0xffffff8000| 1      | 2     | 75     |
|             |        |       |        |
| 0x10010000  | 0      | 0     | 1      |
| 0xfffffe0000| 0      | 82    | 638    |
| 0xfffffe4000| 0      | 39    | 76     |
| 0xfffffe8000| 0      | 112   | 49     |
| 0xfffffec000| 0      | 66    | 24     |
| 0xffffff0000| 0      | 0     | 114    |
| 0xffffff4000| 0      | 0     | 78     |
| 0xffffff8000| 0      | 2     | 80     |

METHOD, SYSTEM AND COMPUTER PROGRAM PRODUCT FOR PROFILING THREAD VIRTUAL MEMORY ACCESSES

BACKGROUND OF THE INVENTION

1. Field of the Invention

The present invention relates to thread processing and multiprocessor systems.

2. Related Art

At any instant in time computers run multiple processes. Metaphorically, a process is a program's breathing air and living space—that is, a running program plus any state needed to continue running it. Each process can involve one or more tasks. Each task can be carried out in one or more threads. Processes can be user application processes and/or operating system processes, such as, a kernel process, a supervisor process, or an executive process. Processes can be executed continuously or interrupted repeatedly. See J. L. Hennessy and D. A. Patterson, "*Computer Architecture: A Quantitative Approach,*" 2nd. Ed. (Morgan Kaufmann Publ.: U.S.A. 1996), pp. 439–483.

Threads for one or more processes can be executed in parallel and/or non-parallel segments. Each thread is typically represented by a context consisting of a program counter, register set, and any required context status words. Multiple threads can be executed on a single processor. Multiple threads for a single task can be run in parallel on different processors in a distributed shared memory multi-processor system. See K. Hwang, "*Advanced Computer Architecture: Parallelism, Scalability and Programmability,*" (McGraw-Hill Inc.: U.S.A. 1993), pp. 491–504.

Each process has its own virtual address space. Virtual memory maps into physical memory. Different processes are then assigned to different regions of physical memory. With virtual memory, a CPU produces virtual addresses for program processes. Virtual memory addresses are translated (or mapped) by hardware and/or software to physical memory addresses. See J. L. Hennessy and D. A. Patterson, "*Computer Architecture: A Quantitative Approach,*" 2nd. Ed. (Morgan Kaufmann Publ.: U.S.A. 1996), pp. 439–483.

Virtual memory allows large programs or combinations of programs to be executed whose entire code and data are too large to be stored in main memory at any one time. Only sections of code and data currently being accessed by threads are stored in virtual memory. Physical memory limitations and underlying memory-architecture need not be considered by a programmer. See G. Coulouris et al., "*Distributed Systems: Concepts and Designs,*" 2nd. Ed. (Addison-Wesley Publ.: U.S.A. 1994), pp. 157–196. In a shared virtual memory (SVM) or virtual shared-memory (VSM) type of distributed shared-memory system, a global virtual address space is shared among different processors clustered at different nodes. See D. Lenoski and W. Weber, "*Scalable Shared-Memory Multi-Processing,*" (Morgan-Kaufmann Publ.: U.S.A. 1995), pp. 1–40, 87–95, 143–203, and 311–316, and Hennessy and Patterson, at Chapter 8, "Multiprocessors," pp. 634–760.

A distributed shared memory (DSM) system, such as, a scalable shared-memory system or a non-uniform memory access (NUMA) system, typically includes a plurality of physically distinct and separated processing nodes each having one or more processors, input/output devices and main memory that can be accessed by any of the processors. The main memory is physically distributed among the processing nodes. In other words, each processing node includes a portion of the main memory. Thus, each processor has access to "local" main memory (i.e., the portion of main memory that resides in the same processing node as the processor) and "remote" main memory (i.e., the portion of main memory that resides in other processing nodes). For each processor in a distributed shared memory system, the latency associated with accessing a local main memory is significantly less than the latency associated with accessing a remote main memory.

As multi-programming, parallel processing, and multi-processor architectures become more widespread, larger numbers of threads must be processed. The number of virtual memory accesses made by threads also increases. To reduce latency in scalable NUMA computer systems, it is desirable to store data in the portion of main memory that exists in the same processing node as the processor that most frequently accesses the data (or as close as possible to the processor that most frequently accesses the data). Threads and data need to be placed at or near a local memory in a node at or near a local processor that executes the threads and operates on the data. When virtual address space is partitioned or distributed across different node memories in a DSM system, it is also desirable to place threads and data at or near a node memory that stores virtual address space (and physical memory address space) accessed most frequently by the threads.

SUMMARY OF THE INVENTION

Virtual memory access patterns of executing program threads need to be analyzed and profiled. In this way, an optimal physical memory placement for data and threads can be determined based on profiles of thread virtual memory accesses. Placement of threads and data is especially important in non-uniform memory access (NUMA) multi-processor systems. In particular, it is desirable to place data in a local memory nearest to the CPU which accesses the data most frequently to reduce latency.

In the present invention, virtual memory access patterns of program threads are analyzed and thread/virtual address histograms are constructed. Among other things, an initial memory placement can be determined from these histograms.

According to the present invention, a method, system, and computer program product are provided for profiling virtual memory accesses by one or more threads. In one embodiment, a virtual memory access thread profiling tool includes a histogram generator and a thread placement file generator. The histogram generator generates a histogram that indicates the relative frequency at which virtual memory addresses are accessed by each program thread. The thread placement file generator generates a thread placement file having placement data that identifies, for each thread, at least one virtual address region representing virtual memory addresses accessed relatively frequently by the respective thread.

To generate the histogram, the histogram generator runs and interrupts each program thread to collect samples. When an interrupt is issued, a program counter is returned. A valid load or store instruction is determined for a thread in assembly code identified by the returned program counter. A virtual memory address corresponding to a valid load or store instruction is then read. A histogram is then incremented based on the virtual memory address to track the relative frequency at which virtual memory addresses are accessed by each thread.

In one example, to determine a valid load or store instruction, the histogram generator walks forward or backward through the assembly code identified by the returned program counter until a valid load or store instruction is reached. During the walk, registers which get written are tracked. A walk forward through assembly code is aborted when at least one of the following two conditions occurs: a branch (conditional or non-conditional) is reached, or a load or store instruction is reached whose address is based on a register that has been modified. A walk backward through the assembly code is aborted when at least one of the following three conditions occurs: a branch (conditional or non-conditional) is reached, a load or store instruction is reached whose address is based upon a register that has been modified, or a branch target is crossed.

According to a further feature of the present invention, further options are provided to allow a user to control the virtual memory access profiling tool. These options include selecting and setting the type of collection method, selecting and setting program counter (PC) and memory address filtering, setting the sampling granularity, providing start/stop control, selecting real-time graphical histogram output, naming file output, and providing placement data to a memory placement tool. In one example, two sample collection methods are supported. The histogram generator can interrupt threads using an interval timer as a sampling trigger so that samples are collected at a predetermined sampling rate. The histogram generator can also interrupt threads using a count of hardware events as a sampling trigger.

Ranges for program counter and virtual memory address filtering can be set. Program counter events and virtual memory addresses outside of permissible ranges are ignored. The virtual memory access profiling tool further permits a user to set a virtual memory address sampling granularity value. For example, the sampling granularity value can be set to a page size, cache-line size, hex size, quad size, double size, or integer size granularity. According to another option, the virtual memory access profiling tool further permits a user to toggle sampling on and off.

Further virtual memory access profiling tool options permit a user to output a histogram in real-time for display at a graphical user-interface, to output a histogram to a named data file, and to output placement data to a named placement data file capable of being accessed by a thread/memory placement tool.

In one example implementation of the present invention, a virtual memory access thread profiling tool is implemented as a profiling command executed by an operating system for a multi-processor system, such as, a NUMA machine.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIG. 3A shows an example histogram table according to the present invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Table of Contents

Figure 1:
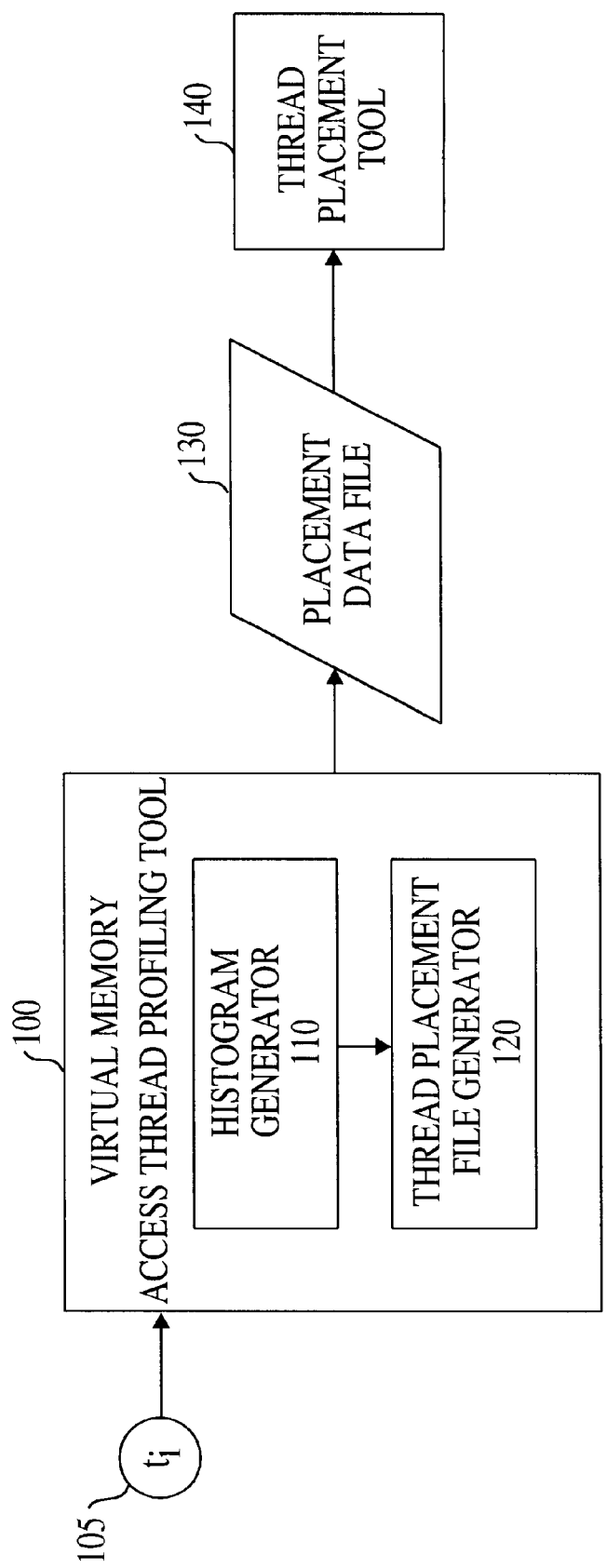
FIG. 1 is a block diagram of a virtual memory access thread profiling tool according to one embodiment of the present invention.

1. Overview and Discussion of the Invention
2. Terminology
3. Example Environment
4. Virtual Memory Access Thread Profiling Tool
5. Example Implementation
6. Example Multiprocessor Memory Management Environment
7. Conclusion

1. Overview and Discussion of the Invention

According to the present invention, a method, system, and computer program product are provided for profiling virtual memory accesses by one or more threads. The virtual memory access thread profiling tool of the present invention includes a histogram generator and a thread placement file generator. The histogram generator generates a histogram that indicates the relative frequency at which virtual memory addresses are accessed by each program thread. The thread placement file generator generates a thread placement file having placement data that identifies at least one virtual address region representing virtual memory addresses accessed relatively frequently by the respective thread.

To generate the histogram, the histogram generator runs and interrupts each program thread to collect samples. When an interrupt is issued, a program counter is returned. A valid load or store instruction is determined for a thread in assembly code identified by the returned program counter. In one example, to determine a valid load or store instruction, the histogram generator walks forward or backward through the assembly code identified by the returned program counter until a valid load or store instruction is reached.

A virtual memory address corresponding to a valid load or store instruction is then read. A histogram is incremented based on the virtual memory address to track the relative frequency at which virtual memory addresses are accessed by each thread.

Further options are provided to allow a user to control the virtual memory access profiling tool. These options include selecting and setting the type of collection method, selecting and setting program counter (PC) and memory address filtering, setting the sampling granularity, providing start/stop control, selecting real-time graphical histogram output, and naming output files. The virtual memory access thread profiling tool can be implemented as a profiling command executed by an operating system for a multi-processor system, such as, a NUMA machine.

2. Terminology

The term "thread" refers to any unit of processor utilization or process, including but not limited to, a program stream with an independent program counter operating within a task. One or more threads can be part of any type of task, such as, a user-application task, an operating system kernel task, or a UNIX process including procedure (proc) processes and processes created by forking.

The term "histogram" includes, but is not limited to, any type of graphical or tabular representation of data for showing a frequency or distribution of data in collected samples.

3. Example Environment

The present invention is described in terms of an example thread processing environment. Given the description herein, it would be apparent to one skilled in the relevant art how to implement the present invention in any computer system supporting single-thread or multi-thread, application or operating system processes including, but not limited to, a single processor or multi-processor system. For example, as described further below, the present invention can be implemented as software in an IRIX™ or Cellular IRIX™ operating system executed by an Origin™ scalable, distributed shared-memory multi-processor platform, manufactured by Silicon Graphics, Inc., Mountain View, Calif.

Description in these terms is provided for convenience only. It is not intended that the invention be limited to application in this example environment. In fact, after reading the following description, it will become apparent to a person skilled in the relevant art how to implement the invention in alternative environments.

4. Virtual Memory Access Thread Profiling Tool

FIG. 1 shows one embodiment of the present invention. A virtual memory access thread profiling tool 100 analyzes virtual memory accesses by one or more threads 105. Virtual memory access thread profiling tool 100 includes a histogram generator 110 and a thread placement file generator 120. The operation of histogram generator 110 is described further with respect to histogram routine 200 in FIG. 2. Virtual memory access thread profiling tool 100 outputs a thread placement file 130 that lists virtual address regions accessed by respective threads. A thread placement tool 140 uses information provided in the placement file 130 to optimize thread and data placement over a distributed shared memory system.

As mentioned above, virtual memory access thread profiling tool 100 analyzes which regions of virtual memory are accessed by each program thread 105. Virtual memory access thread profiling tool 100 is first initialized. Numerous options are set to user-identified input values or default values. These options include, but are not limited to, collection method (trigger) and rate, program counter (PC) and memory address filter, sampling granularity, start/stop control, selecting real-time graphical histogram output, naming file output, and providing placement data to a memory placement tool. Each of the options are described in further detail below with respect to an example implementation.

Figure 2:
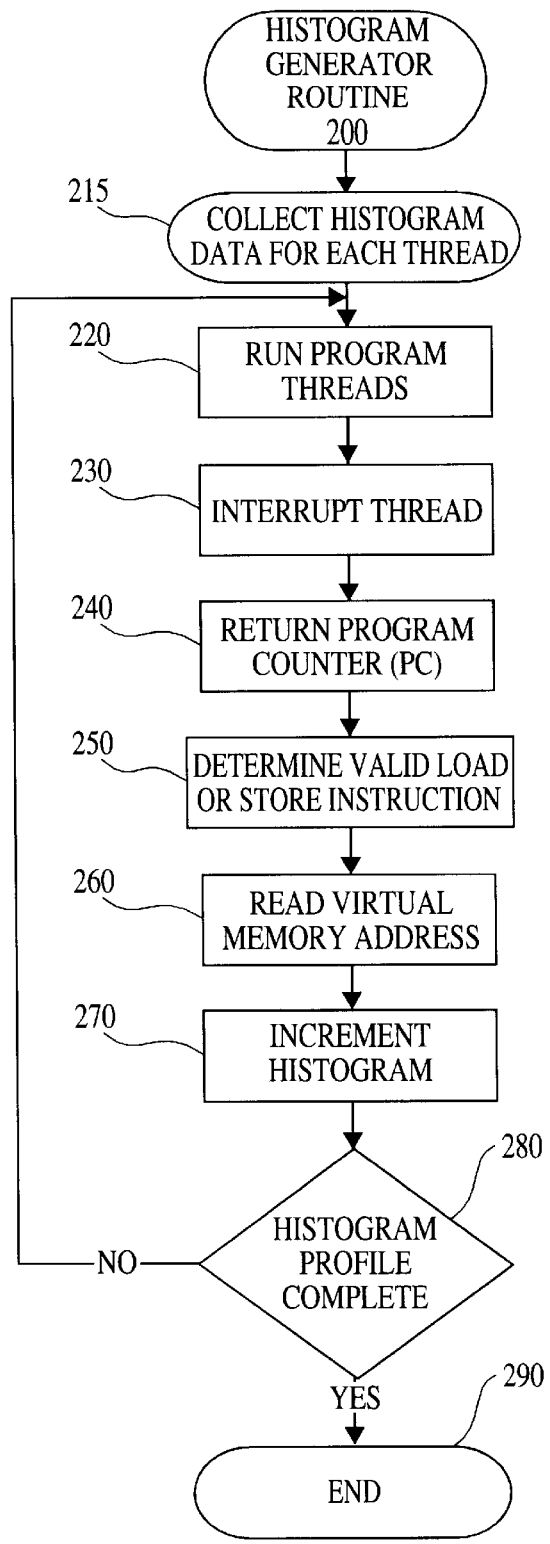
FIG. 2 is a flowchart showing a histogram generator routine according to one embodiment of the present invention.

Once the virtual memory access thread profiling tool 100 is initialized, histogram generator 110 generates a histogram representing the frequency of virtual memory addresses accesses by each thread. As shown in FIG. 2, histogram generator 110 begins histogram generator routine 200. In particular, histogram generator 110 collects histogram data samples for each thread by executing a loop 215 (steps 220–280).

First, each program thread begins to run (step 220). Multiple threads from one or more applications can be run. Threads can be run in parallel or sequentially. Histogram data for each thread can likewise be collected for each thread in parallel or serial fashion depending upon particular performance needs. For clarity, steps 230 to 280 will be described with respect to one thread. As would be understood by a person skilled in the art given this description, steps 230 to 280 are also performed upon all threads running in parallel or non-parallel segments.

In step 230, a thread is interrupted when a predetermined sampling interval has expired. In response to an interrupt, a program counter (PC) is returned (step 240). The program counter can be a conventional PC that points to an assembly code instruction for the thread being run at the time of interrupt. For instance, when an interrupt is issued, an operating system sets a PC to reference one or more registers containing the assembly code instruction being executed at the time of interrupt.

In step 250, histogram generator 110 determines a valid load or store instruction. Starting at the instruction identified by the PC, histogram generator 110 walks forward through assembly code text until a valid load or store instruction is read. As the assembly code text is read, histogram generator 110 keeps track of which general program (gp) registers get written. In this way, a valid load or store operation which accesses memory can be distinguished from load and store operations which only access registers. A walk forward through assembly code is aborted when at least one of the following two conditions occurs: a branch (conditional or non-conditional) is reached or, a load or store instruction is reached whose address is based on a gp register that has been modified. The walk backward through assembly code text is aborted when either of the following three conditions occurs: a branch (conditional or unconditional) is reached, a load or store instruction is reached whose address is based on a gp register that has been modified, or a potential branch target is crossed.

When a valid load or store instruction is determined, a corresponding virtual memory address corresponding to the load or store instruction is read (step 260). A histogram is then incremented based on the virtual memory address read in step 260 to track the frequency in which virtual memory addresses are accessed by the corresponding thread (step 270). Steps 220 to 270 are repeated until a virtual memory address profile has been completed for each thread (step 280). For example, steps 220 to 270 can be repeated until a predetermined length of time has expired or until a predetermined number of memory accesses have been recorded in a histogram. Once the virtual memory address profile is complete and a histogram has been generated, histogram generator routine 200 ends (step 290). At this stage a histogram lists the relative frequency of memory accesses by each thread to different virtual memory addresses or address ranges.

Thread placement file generator 120 generates a thread placement file 130 based on the histogram generated by histogram generator 110. In particular, thread placement file generator 120 analyzes the histogram to identify sets of virtual memory addresses or a range of addresses corresponding to respective threads. Each set of virtual memory addresses then represents the region of virtual memory most frequently accessed by a thread.

FIG. 3A shows an example of a histogram 300 that lists in a table the relative frequency of memory accesses by each thread to different virtual memory addresses or address ranges. Histogram 300 has four columns (virtual memory address, thread, number of reads, and number of writes). In this way, histogram 300 records the number of reads and writes to respective virtual memory addresses made by each thread (0–3) during the time the profile was generated.

Figure 3B:
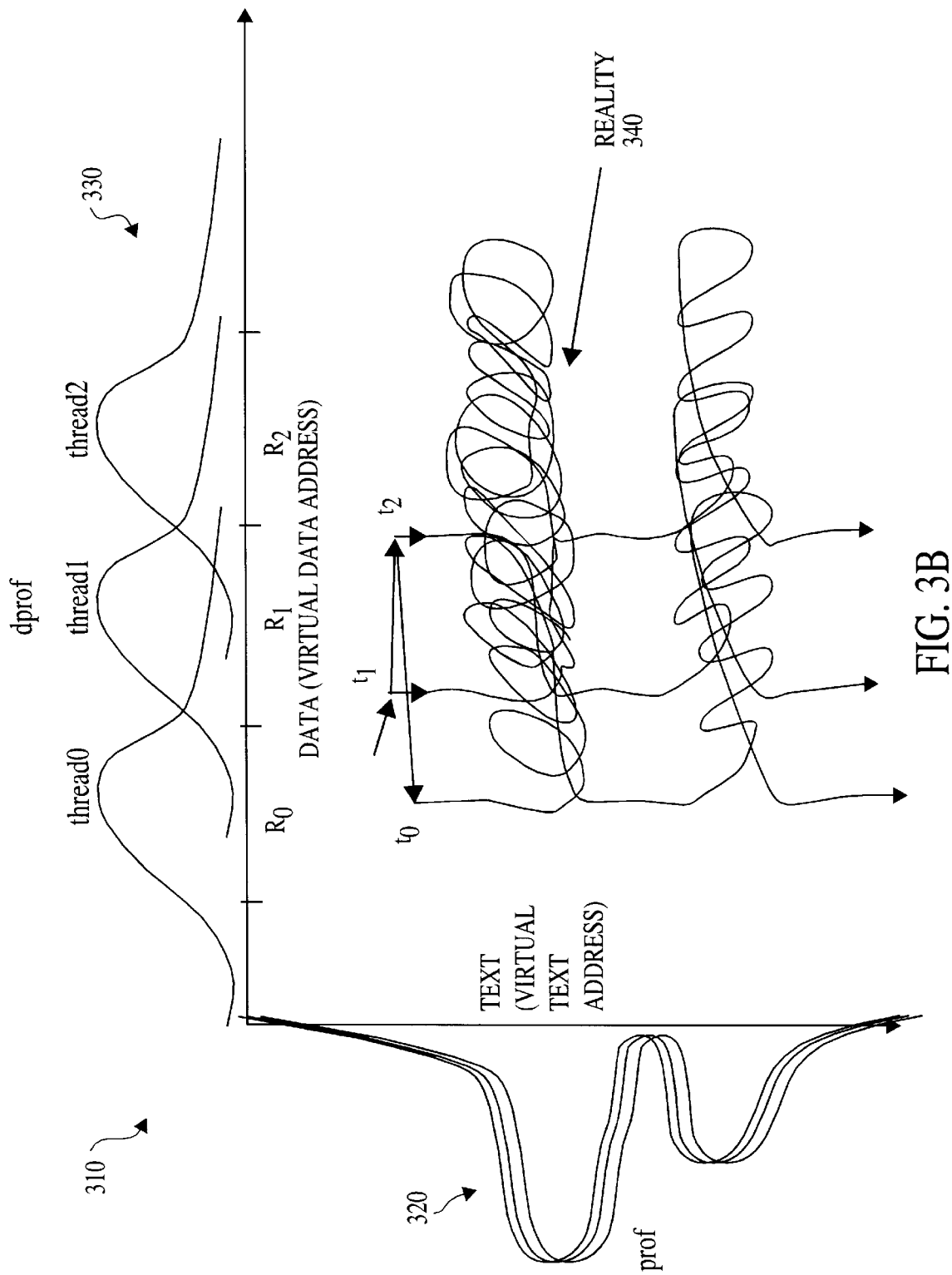
FIG. 3B is a graph of the data in the histogram table shown in FIG. 3A.

FIG. 3B shows graphically the relative frequency of memory accesses by each thread to different virtual memory addresses or address ranges as tracked in a histogram table. In particular, FIG. 3B shows a graph 310 of the data in the histogram table 300. For clarity, only three of the four threads are shown (threads $t_0$, $t_1$, $t_2$). Graph 310 includes two axes, Text and Data. Profiles 320, labeled "prof," are drawn for each thread along the Text (virtual text address) axis. Prof profiles 320 show the relative number of samples taken at different virtual text addresses in the assembly code text. Thus, in this example, prof profiles 320 show each thread $t_0$, $t_1$, $t_2$ spends most of its time in one of two programming loops in the assembly code.

Profiles 330, labeled "dprof," are drawn for each thread along the Data (virtual data address) axis. Dprof profiles 330 show the relative number of samples (read or write virtual memory accesses) taken for each thread at different virtual data addresses. Thus, in this example, dprof profiles 330 show threads $t_0$, $t_1$, $t_2$ access three respective virtual memory address ranges R0, R1, R2 most frequently. Reality plot 340 further shows the real virtual text address and virtual data addresses for threads $t_0$, $t_1$, $t_2$ during runtime, confirming the information represented in the prof and dprof profiles 320, 330.

An example thread placement file 130 that lists the regions of virtual memory most frequently accessed by corresponding n threads has the following format:

| Placement file format | |
|---|---|
| address-range-R0 | thread0 |
| address-range-R1 | thread1 |
| address-range-R2 | thread2 |
| address-range-Rn-1 | threadn-1 |

In the example described with respect to FIGS. 3A and 3B, thread placement file 130 for four threads lists thread0 and address range R0, thread1 and address range R1, thread2 and address range R2, and thread n-1 and address range Rn-1 (e.g. thread 3, R3).

Thread placement file 130 can be output for display, storage, or further processing. In one preferred embodiment, thread placement file 130 is passed to a thread/memory placement tool 140 to optimize thread and data placement over a distributed shared memory system.

According to the present invention, virtual memory access profiling tool 100 can be implemented primarily in software, firmware, hardware, or any combination thereof. In one preferred embodiment, virtual memory access profiling tool 100 is implemented as a software routine executing on a general purpose or specific purpose computer. As would be apparent to one skilled in the art, such software can also be provided over a communication link (i.e., "downloaded") or provided in a computer program product having a computer useable medium having computer program logic recorded thereon (i.e., a disk).

5. Example Implementation

Virtual memory access thread profiling tool 100 can be implemented as a software routine. In one example implementation, virtual memory access profiling tool 100 is implemented as a profiling command, called, dprof. Dprof profiling command receives options and arguments to control the virtual memory access profiling operation. The available options and arguments and their operation for an example dprof command are listed in the following Table:

| | DATA PROFILING TOOL COMMAND |
|---|---|
| NAME | dprof - a memory access profiling tool |
| SYNOPSIS | dprof[options]program[args] |
| | collection method (trigger) and rate |
| |     [-itimer[-ms n]] |
| |     [-hwpc [-cntr *n*][-ovfl *n*]] |
| | pc filter and memory address filter |
| |     [-pcmin min][-pcmax max] |
| |     [-damin min][-damax max] |
| | sampling granularity |
| |     [-page\| -line\| -hex\| -oct\| -quad\| -double\| -int] |
| | start/stop control |
| |     [-sigusr] |
| | realtime-graphical histogram |
| |     [-gui] |
| | histogram output |
| |     [-out file] |
| | placement info for *dplace* |
| |     [-pout file][-threads_per_mem n] |
| DESCRIPTION | Gives users the ability to analyze which regions of virtual memory each thread of a program accesses. There are numerous sampling methods, user filters, and varying output formats. The given command is executed and memory accesses are sampled; after completion; *dprof* prepares a histogram of memory accesses. Histograms are computed for each thread of multi-threaded applications that utilize fork(2) or sproc(2). |
| OPTIONS | dprof [-itimer [-ms n]] |

-continued

DATA PROFILING TOOL COMMAND

|  | [-hwpc [-cntr *n*][-ovfl *n*]]<br>[-pcmin *min*][-pcmax *max*]<br>[-damin *min*][-damax *max*]<br>[-page][-hex][-oct][-quad][-double][-int]<br>[-outfile][-pout *dplace_file*][-threads_per_mem *n*]<br>[-verbose]*command* |
|---|---|
| -itimer | Use the interval timer as a sampling trigger. |
| -ms *n* | Trigger every *n* milliseconds. (default is 100) |
| -hwpc | Use R10000 hardware event counter overflow as a sampling trigger. |
| -cntr *n* | Use R10000 hardware event counter *n* as the event trigger. Default is number of cycles; event 0. |
| -ovfl *n* | Trigger after *n* events have occurred. Default is 10,000. |
| -pcmin *min* | Ignore events that have a program counter smaller than *min*. |
| -pcmax *max* | Ignore events that have a program counter larger than *max*. |
| -damin *min* | Ignore memory operations that have a virtual addresses smaller than *min*. |
| -damax *max* | Ignore memory operations that have virtual addresses larger than *max*. |
| -page | Use pagesize (16k bytes) granularity for memory access sampling. |
| -line | Use cache linesize (128 bytes) size granularity for memory access sampling. |
| -hex | Use hex (64 bytes) size granularity for memory access sampling. |
| -oct | Use oct (32 bytes) size granularity for memory access sampling. |
| -quad | Use quad (16 bytes) size granularity for memory access sampling. |
| -double | Use double (8 bytes) size granularity for memory access sampling. |
| -int | Use int (4 bytes) size granularity for memory access sampling. |
| -sigusr | Sampling is not started until SIGUSRI is received. Further SIGUSRI signals toggle sampling off and on. |
| -out *file* | Output is sent to *file* rather than standard output. |
| -pout *dplace_file* | Placement information suitable for dplace(1) is written to *dplace_file*. |
| [-threads_per_mem *n*] | When building *dplace_file* a thread assignment that assumes *n* threads per memory is assumed. |
| EXAMPLE | To collect a memory access histogram from a program called "a.out" a user would execute run command % and program name, *a.out*<in>out. To place the histogram results in a file called *histogram* one would simply execute run command, % dprof-out *histogram a.out*<in>out. |
| DEPENDENCIES | dprof options -hwpc, -entr n and -ovfl *n* only apply to R10000 based systems. |
| SEE ALSO | dplace(1), sproc(2), r10k_counters(5) |

As described above, options for the virtual memory access thread profiling tool, dprof command, include, but are not limited to, selecting and setting the type of collection method, selecting and setting program counter (PC) and memory address filtering, setting the sampling granularity, providing start/stop control, selecting real-time graphical histogram output, and naming file output. Collection method (trigger) and rate options are set by the following parameters: -itimer[-ms n], -hwpc[-cntr n], -ovf1 n. One of two collection methods can be used. Samples can be collected using an interval timer as a sampling trigger. The parameters -itimer and -ms n are used to collect samples using the interval timer as a sampling trigger over a predetermined time interval at a sampling rate. Parameter -itimer identifies the use of the interval timer as a sampling trigger. Parameter -ms n sets the trigger to every n milliseconds (a default setting equals 100 milliseconds).

Alternatively, samples can be collected using hardware events as a sampling trigger. The parameters -hwpc[-cntr n], -ovf1 n are used to collect samples using R10000 hardware events as a sampling trigger. Parameter -hwpc identifies the use of the R10000 hardware event counter overflow as a sampling trigger. Parameter -cntr n identifies the use of R10000 hardware event counter n as the event trigger (a default setting is the number of cycles, event 0).

Figure 3C:
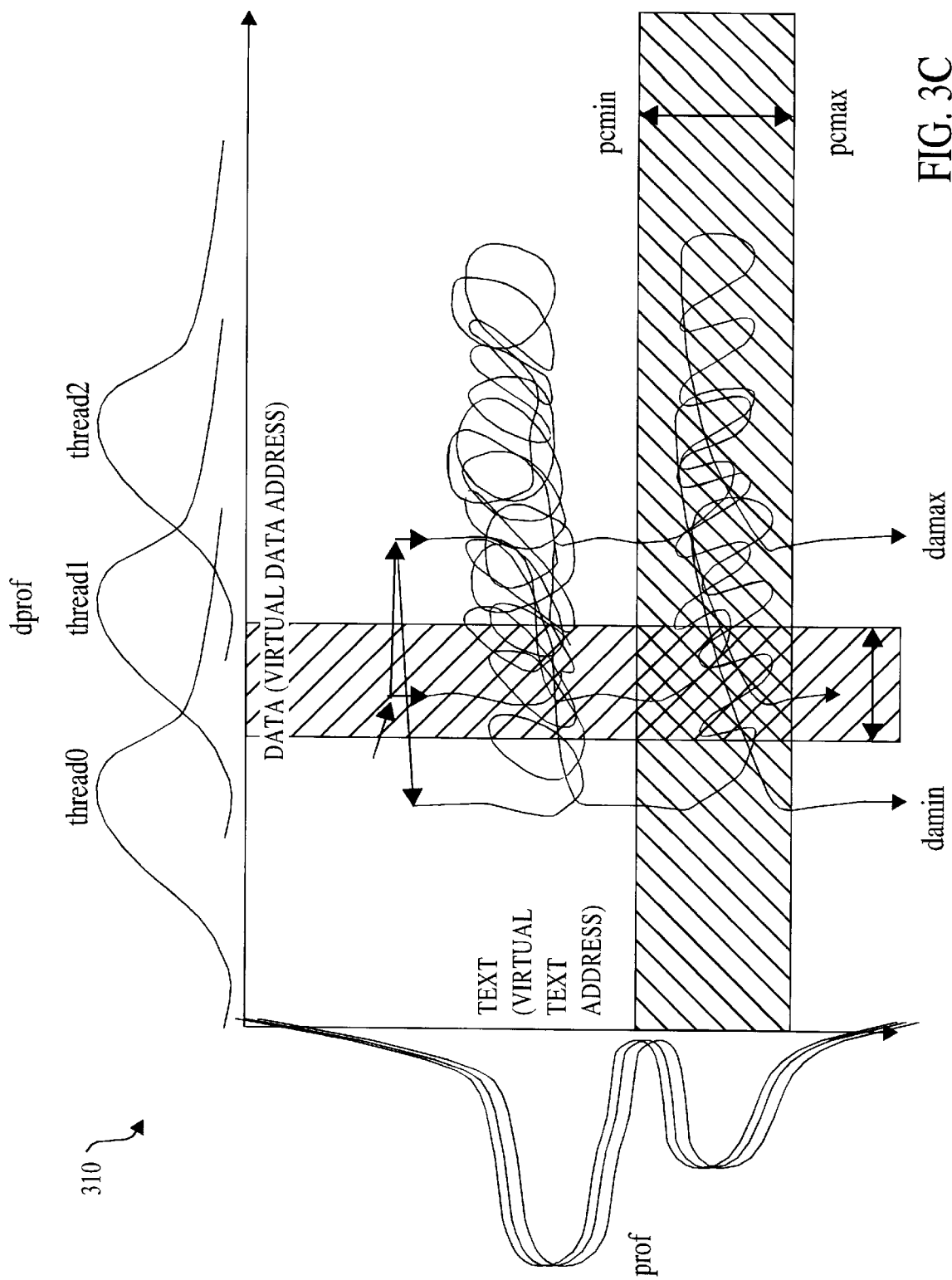
FIG. 3C shows the graph of FIG. 3B when program counter and memory address filtering options are set.

PC and memory address filtering options are set by the following parameters: [-pcmin min] [-pcmax max] [-damin min] [-damax max]. The parameter -pcmin min sets the dprof command to ignore events that have a program counter smaller than min. The parameter -pcmax max sets the dprof command to ignore events that have a program counter larger than max. The parameter -damin min sets the dprof command to ignore memory operations that have virtual addresses smaller than min. The parameter -damax max sets the dprof command to ignore memory operations that have virtual addresses larger than max. FIG. 3C shows graph 310, described above with respect to FIG. 3B, when PC and memory address filtering options are set by -pcmin min, -pcmax max, -damin min, and -damax max parameters.

Sampling granularity is set by the following parameters: -page, -line, -hex, -oct, -quad, -double, and -int. The -page parameter sets dprof command to use a pagesize granularity (e.g., 16k bytes) for memory access sampling. The -line parameter sets dprof command to use a cacheline size granularity (e.g., 128 bytes) for memory access sampling. The -hex parameter sets dprof command to use a hex size granularity (e.g., 64 bytes) for memory access sampling. The -oct parameter sets dprof command to use an oct size granularity (e.g., 32 bytes) for memory access sampling. The -quad parameter sets dprof command to use a quad size granularity (e.g., 16 bytes) for memory access sampling. The -double parameter sets dprof command to use a double size granularity (e.g., 8 bytes) for memory access sampling. The -int parameter sets dprof command to use an int size granularity (e.g., 4 bytes) for memory access sampling. The present invention is not necessarily limited to these specific granularity options. Smaller and/or larger granularities can be used.

Start/stop control of sampling is set by a -sigusr parameter. Sampling is not started until a -sigusr entry (e.g., SIGUSR1) is received. Further -sigusr entries (e.g., SIGUSR1) toggle sampling on and off.

Realtime-graphical histogram output is set by a -gui parameter. When the -gui parameter is set, a graphical histogram is output in real-time for display to a graphical user-interface. In this way, a user can observe a histogram table as it is being built to observe trends and modify sampling.

The parameter -out file sets the dprof command to output the histogram to the named file rather than a standard file output. The parameter -pout dplace_file sets the dprof command to output placement information (e.g., virtual address ranges and threads) for a placement file 130 to a dplace_file for use in a memory placement tool 140, such as, the dplace command. The parameter -threads_per_memory n sets the dplace command to build a thread assignment assuming n threads can be used per memory.

6. Example Multiprocessor Memory Management Environment

Given the description herein, it would be apparent to one skilled in the relevant art how to implement the present invention in any computer system supporting single-thread and multi-thread application or operating system processes including, but not limited to, a single processor or multi-processor system. See, e.g., the multithreaded and multiprocessor systems in Catanzaro, "*Multiprocessor System Architectures: A Technical Survey of Multiprocessor/ Multithreaded Systems Using SPARC®, Multilevel Bus Architectures, and Solaris®(SunOS)™,*" (Sun Microsystems, Inc.: U.S.A. 1994) (incorporated in its entirety herein by reference); D. Lenoski and W. Weber, "*Scalable Shared-Memory Multi-Processing,*" (Morgan-Kaufmann Publ.: U.S.A. 1995), (incorporated in its entirety herein by reference); Hennessy and Patterson, at Chapter 8, "Multiprocessors," pp. 634–760 (incorporated herein by reference); K. Hwang, "*Advanced Computer Architecture: Parallelism, Scalability and Programmability,*" (McGraw-Hill Inc.: U.S.A. 1993), (incorporated in its entirety herein by reference); and G. Coulouris et al., "*Distributed Systems: Concepts and Designs,*" 2nd. Ed. (Addison-Wesley Publ.: U.S.A. 1994), (incorporated in its entirety herein by reference).

In one preferred example, the present invention can be implemented as software compatible with an IRIX™ or Cellular IRIX™ operating system and executed by an Origin™ scalable, distributed shared-memory multi-processor platform, manufactured by Silicon Graphics, Inc., Mountain View, Calif.

Figure 4:
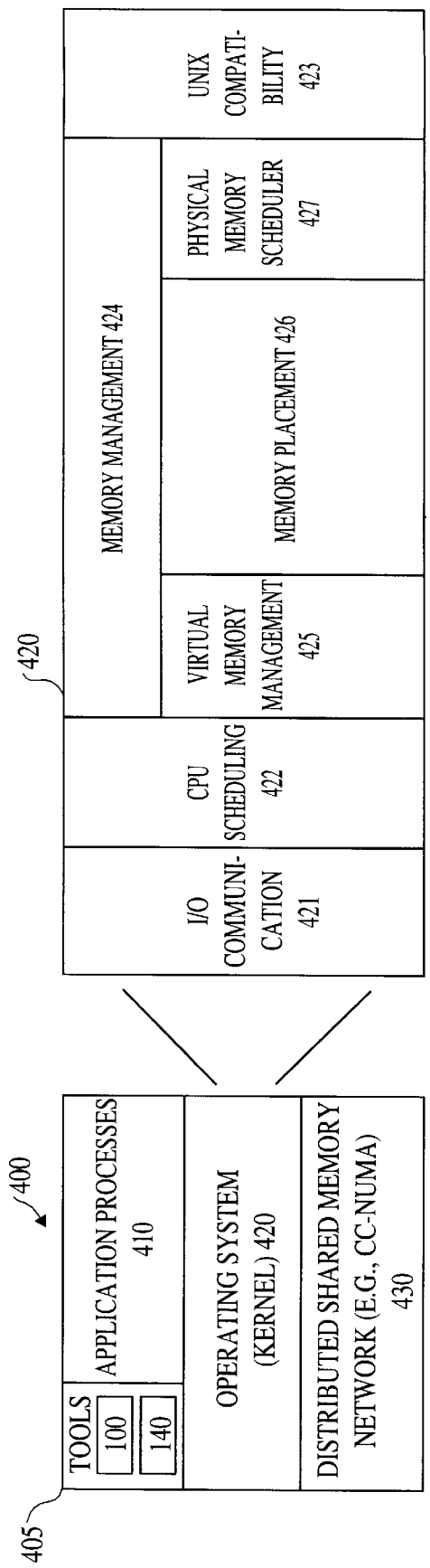
FIGS. 4, 5, and 6 are diagrams of a multiprocessor memory management system according to one preferred implementation of the present invention.
Figure 5:
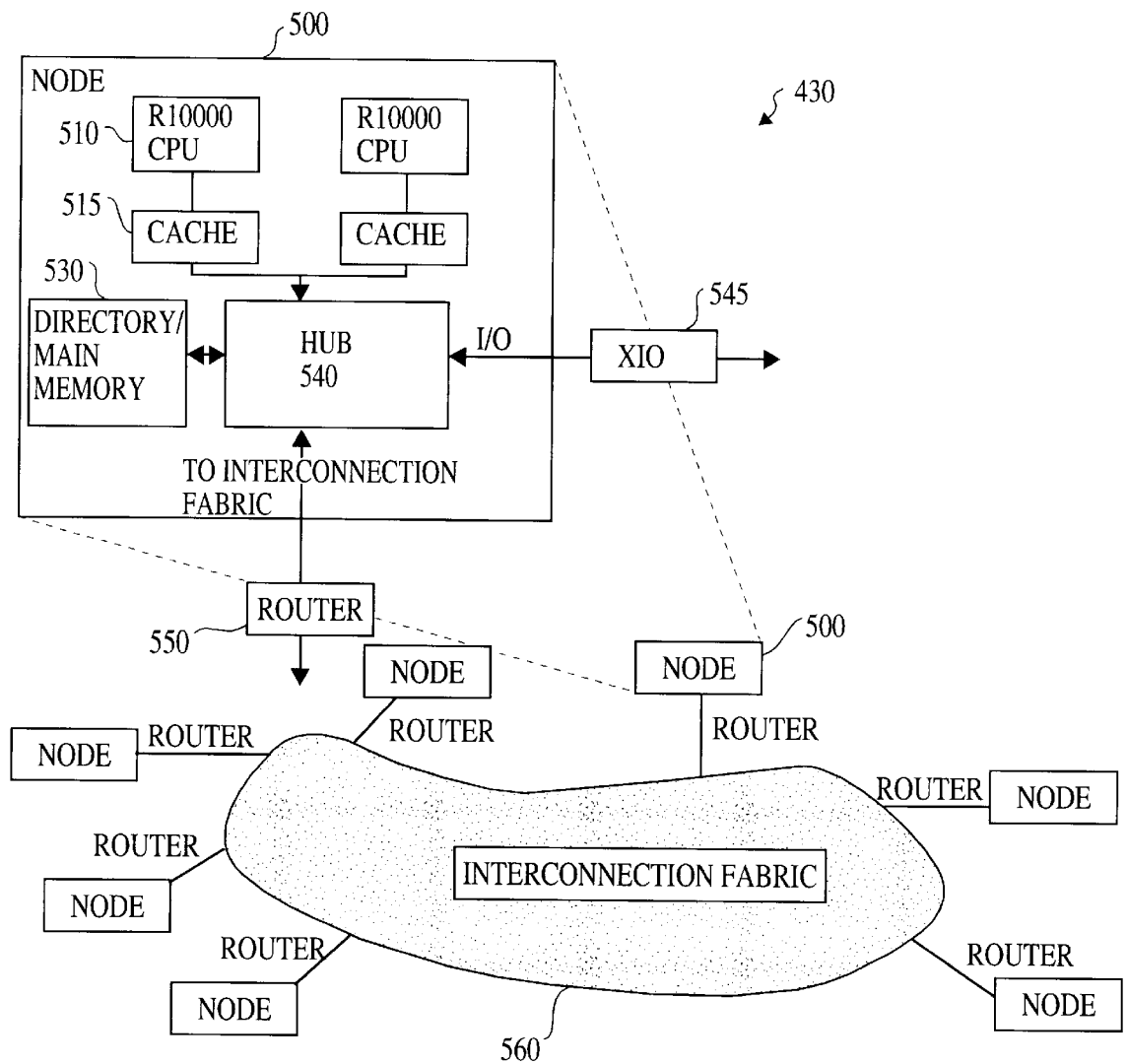
Figure 6:
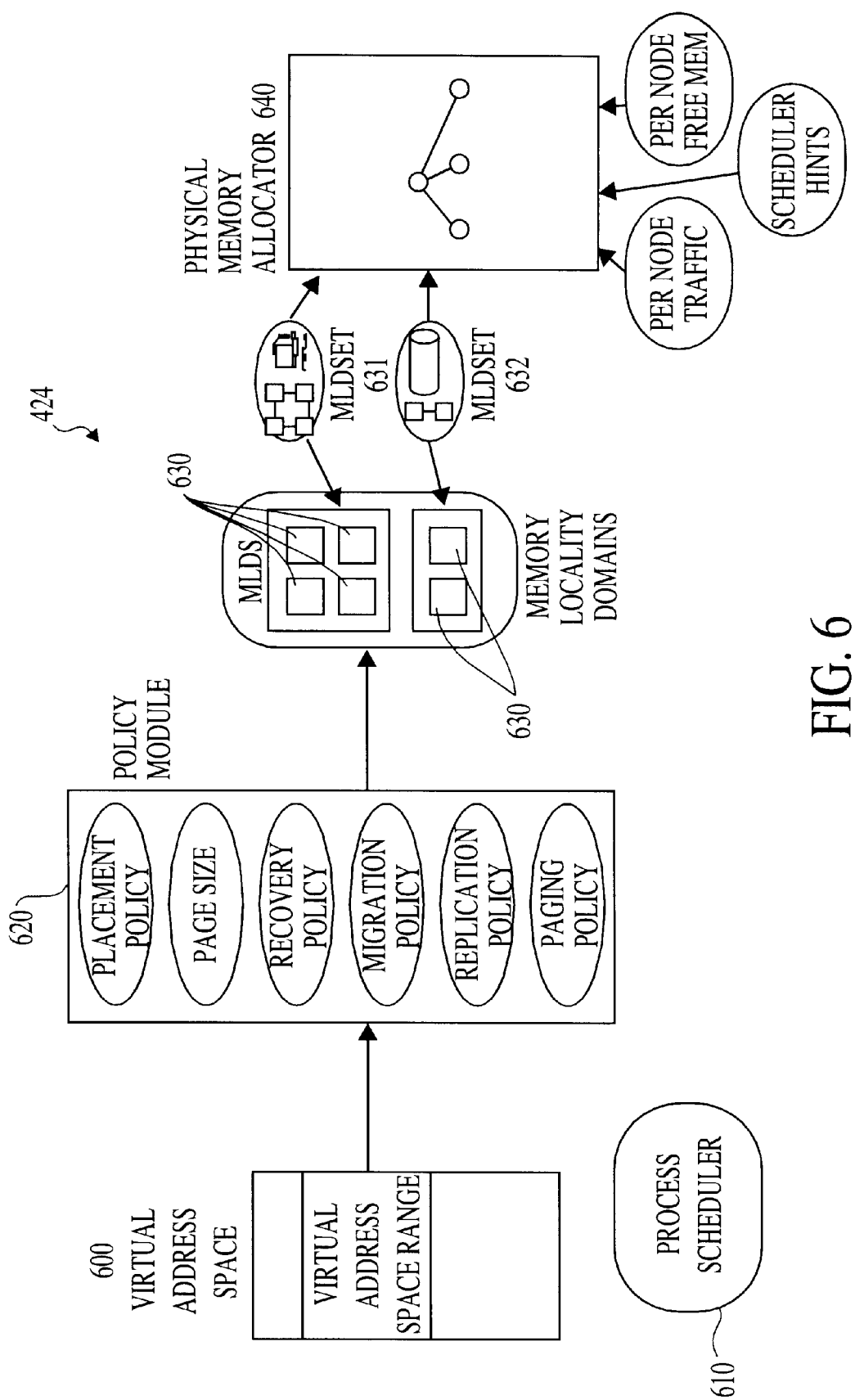

FIGS. 4 to 6 are diagrams of a multiprocessor system 400 according to one preferred implementation of the present invention. Multiprocessor system 400 includes tools 405, application processes 410, and operating system (kernel) 420 which run on a distributed shared memory (DSM) network 430 (FIG. 4). Tools 405 can include virtual memory access thread profiling tool 100 and thread placement tool 140. In one preferred example, DSM network 430 is a scalable, cache-coherent, directory-based non-uniform memory access (CC-NUMA) multi-node network as used in Origin 200 and Origin 2000 machines, manufactured by Silicon Graphics, Inc., Mountain View, Calif.

As shown in FIG. 5, DSM network 430 has a hardware topology consisting of multiple nodes 500 coupled by routers 550 to an interconnection fabric 560, also called an interconnection network. Each node 500 has one or more local processors 510 and a local memory 530 coupled to a hub 540. For example, node 500 has two R10000 CPUs 510, respective caches 515, a directory-based main memory 530, and a hub 540. Hub 540 is further coupled to an external I/O device 545 and to a router 550. DSM network 430 can scale (cost-effectively and without degradation of performance) to any number of processors including, but not limited to, a number of processors in a range between 1 to 256 processors.

Operating system 420 supports I/O communication 421, CPU scheduling 422, UNIX compatibility 423, and memory management 424. For example, UNIX compatibility 423 can provide compatibility between operating system 420 processes and UNIX System V, Release 4 processes. See, B. Goodheart and J. Cox, "*The Magic Garden Explained, The Internals of UNIXSystem VRelease 4, An Open Systems Design,*" (Prentice-Hall: Australia 1994), pp. 1 to 279 (incorporated by reference herein). Operating system 420 can be compatible with other operating systems (e.g., MS-DOS), languages, libraries, databases, file systems, and communication protocols.

Operating system 420 further provides memory management 424 which is responsible for virtual memory management 425, memory placement 426, and physical memory scheduling 427. As shown in further detail in FIG. 6, memory management 424 includes two memory management mechanisms: memory locality domains (MLDs) 630 and policy modules 620. MLDs 630 provide a mechanism for establishing where virtual address space 600 should be placed, that is, where virtual address space should be physically located. MLDs 630 describe how closely memory pages must be placed together by a physical memory allocator 640 on potentially non-contiguous physical memory and where memory and threads should be located on the system in relation to graphics and I/O resources. Two or more MLDs 630 can be grouped together in a MLD set 631, 632.

Policy modules 620 are used in conjunction with MLDs 630 and/or MLDsets 631, 632 to determine how the virtual address space will behave on the hardware topology of distributed shared memory network 430. In particular, policy module 620 include modules for setting placement policy, page size, recovery policy, migration policy, replication policy, and paging policy.

7. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for profiling frequencies of accesses made to a virtual memory by a program thread, comprising the steps of:

running the program thread; and generating a profile that indicates the frequencies at which virtual memory addresses are accessed by the thread.

2. The method of claim 1, further comprising the step of generating placement data that identifies at least one virtual address region for the program thread, said at least one virtual address region representing virtual memory addresses accessed relatively frequently by the program thread.

3. The method of claim 1, wherein said profile generating step comprises the steps of:

interrupting the thread;

returning a program counter;

using said returned program counter to determine a valid load or store instruction for the thread in assembly code;

reading a virtual memory address corresponding to said valid load or store instruction; and incrementing said profile based on said virtual memory address to track the frequencies at which virtual memory addresses are accessed by the thread.

4. The method of claim 3, wherein said using step comprises the steps of:

walking forward through said assembly code identified by said returned program counter until a valid load or store instruction is reached;

tracking registers which get written; and aborting said walking when at least one of the following two conditions occurs: a branch is reached, or a load or store instruction is reached whose address is based on a register that has been modified.

5. The method of claim 3, wherein said using step comprises the steps of:

walking backward through said assembly code identified by said returned program counter until a valid load or store instruction is reached;

tracking registers which get written; and aborting said walking when at least one of the following three conditions occurs: a branch is reached, a load or store instruction is reached whose address is based on a register that has been modified, or a branch target is crossed.

6. The method of claim 3, wherein said thread interrupting step uses an interval timer as a sampling trigger.

7. The method of claim 3, wherein said thread interrupting step uses a count of hardware events as a sampling trigger.

8. The method of claim 3, further comprising the step of:

filtering said program counter returned in said returning step to determine whether said program counter is within a range of maximum and minimum values.

9. The method of claim 3, further comprising the step of:

filtering said virtual memory address read in said reading step to determine whether said virtual memory address is within a range of maximum and minimum values.

10. The method of claim 3, further comprising the step of permitting a user to set a virtual memory address sampling granularity value.

11. The method of claim 3, further comprising the step of permitting a user to toggle sampling on and off.

12. The method of claim 3, further comprising the step of outputting said profile in real-time for display at a graphical user-interface.

13. The method of claim 2, further comprising the steps of:

outputting said profile to a first data file; and outputting said placement data to a placement data file capable of being accessed by a memory placement tool.

14. The method of claim 6, wherein said thread interrupting step further comprises the step of:

collecting samples at a predetermined sampling rate.

15. The method of claim 8, wherein said filtering step further comprises the step of:

ignoring program counter events outside of said range.

16. The method of claim 9, wherein said filtering step further comprises the step of:

ignoring virtual memory addresses outside of said range.

17. The method of claim 1, wherein said profile includes a histogram, wherein said generating step further comprises:

generating a histogram that indicates a distribution in the frequencies at which virtual memory addresses are accessed by the thread.

18. The method of claim 1, wherein said generating step comprises:

generating a profile that indicates the respective frequency at which each virtual memory address is accessed.

19. The method of claim 1, wherein said generating step comprises:

generating a profile that indicates the frequency at which a virtual memory address is accessed relative to the frequencies at which other virtual memory addresses are accessed.

20. A method for profiling frequencies of accesses made to a virtual memory by multiple program threads, comprising the steps of:

running multiple program threads; and generating a profile that indicates the frequencies at which virtual memory addresses are accessed by each thread.

21. The method of claim 20, wherein said profile includes a histogram, wherein said generating step further comprises:

generating a histogram that indicates a distribution in the frequencies at which virtual memory addresses are accessed by the thread.

22. The method of claim 20, wherein said generating step comprises:

generating a profile that indicates the respective frequency at which each virtual memory address is accessed.

23. The method of claim 20, wherein said generating step comprises:

generating a profile that indicates the frequency at which a virtual memory address is accessed relative to the frequencies at which other virtual memory addresses are accessed.

24. A system for profiling frequencies of accesses made to a virtual memory by a program thread, comprising:

means for running the program thread; and means for generating a profile that indicates the frequencies at which virtual memory addresses are accessed by the thread.

25. The system of claim 24, further comprising means for generating placement data that identifies at least one virtual address region for the program thread, said at least one virtual address region representing virtual memory addresses accessed relatively frequently by the program thread.

26. The system of claim 25, further comprising:

means for outputting said profile to a first data file; and means for outputting said placement data to a placement data file capable of being accessed by a memory placement tool.

27. The system of claim 24, wherein said profile generating means comprises:

means for interrupting the thread;

means for returning a program counter;

means for using said returned program counter to determine a valid load or store instruction for said thread in assembly code;

means for reading a virtual memory address corresponding to said valid load or store instruction; and means for incrementing said profile based on said virtual memory address to track the frequencies at which virtual memory addresses are accessed by the thread.

28. The system of claim 27, wherein said valid load or store instruction determining means comprises:

means for walking forward through said assembly code identified by said returned program counter until a valid load or store instruction is reached;

means for tracking registers which get written; and means for aborting said walking when at least one of the following two conditions occurs: a branch is reached, or a load or store instruction is reached whose address is based on a register that has been modified.

29. The system of claim 27, wherein said valid load or store instruction determining means comprises:

means for walking backward through said assembly code identified by said returned program counter until a valid load or store instruction is reached;

means for tracking registers which get written; and means for aborting said walking when at least one of the following three conditions occurs: a branch is reached, a load or store instruction is reached whose address is based on a register that has been modified, or a branch target is crossed.

30. The system of claim 27, wherein said thread interrupting means uses an interval timer as a sampling trigger.

31. The system of claim 27, wherein said thread interrupting means uses a count of hardware events as a sampling trigger.

32. The system of claim 27, further comprising:

means for filtering said program counter returned by said returning means to determine whether said program counter is within a range of maximum and minimum values.

33. The system of claim 27, further comprising:

means for filtering said virtual memory address read by said reading means to determine whether said virtual memory address is within a range of maximum and minimum values.

34. The system of claim 27, further comprising means for permitting a user to set a virtual memory address sampling granularity value.

35. The system of claim 27, further comprising means for permitting a user to toggle sampling on and off.

36. The system of claim 27, further comprising means for outputting said profile in real-time for display at a graphical user-interface.

37. The system of claim 24, wherein said profile includes a histogram.

38. The system of claim 24, wherein said profile indicates the respective frequency at which each virtual memory address is accessed.

39. The system of claim 24, wherein said profile indicates the frequency at which a virtual memory address is accessed relative to the frequencies at which other virtual memory addresses are accessed.

40. A system for profiling frequencies of accesses made to a virtual memory by multiple program threads, comprising:

means for running multiple program threads; and means for generating a profile that indicates the frequencies at which virtual memory addresses are accessed by each thread.

41. The system of claim 40, wherein said profile includes a histogram.

42. The system of claim 40, wherein said profile indicates the respective frequency at which each virtual memory address is accessed.

43. The system of claim 40, wherein said profile indicates the frequency at which a virtual memory address is accessed relative to the frequencies at which other virtual memory addresses are accessed.

44. A virtual memory access thread profiling tool, comprising:

a profile generator that generates a profile that indicates the frequencies at which virtual memory addresses are accessed by each thread; and a thread placement file generator for generating placement data based on said profile, wherein said placement data identifies at least one virtual address region for each thread, said at least one virtual address region representing virtual memory addresses accessed relatively frequently by the respective thread.

45. The system of claim 44, wherein said profile includes a histogram.

46. A computer program product comprising a computer usable medium having computer program logic recorded thereon for enabling a processor in a computer system to profile frequencies of accesses made to a virtual memory by a program thread, said computer program logic comprising:

means for enabling the processor to run the program thread; and means for enabling the processor to generate a profile that indicates the frequencies at which virtual memory addresses are accessed by the thread.

47. The system of claim 46, wherein said profile includes a histogram.

48. A system comprising:

a processor executing at least one program thread; and a profiling command for directing an operating system to profile frequencies of accesses made to a virtual memory by each thread.

49. The system of claim 48, wherein said profile indicates the respective frequency at which each virtual memory address is accessed.

50. The system of claim 48, wherein said profile indicates the frequency at which a virtual memory address is accessed relative to the frequencies at which other virtual memory addresses are accessed.

* * * * *

UNITED STATES PATENT AND TRADEMARK OFFICE
CERTIFICATE OF CORRECTION

PATENT NO.    : 5,974,536
DATED         : October 26, 1999
INVENTOR(S)   : John L. Richardson It is certified that error appears in the above-identified patent and that said Letters Patent is hereby Corrected as shown below:

On the title page, Item [56] please add the following cited references:

U.S. Patent No. 4,823,111, 4/1989 to Tsuchiya et al.
U.S. Patent No. 5,093,913, 3/1992 to Bishop et al.
U.S. Patent No. 5,161,156, 11/1992 to Baum et al.
U.S. Patent No. 5,228,127, 7/1993 to Ikeda et al.
U.S. Patent No. 5,237,673, 8/1993 to Orbits et al.
U.S. Patent No. 5,247,673, 9/1993 to Costa et al.
U.S. Patent No. 5,269,013, 12/1993 to Abramson et al.
U.S. Patent No. 5,325,526, 6/1994 to Cameron et al.
U.S. Patent No. 5,349,664, 9/1994 to Ikeda et al.
U.S. Patent No. 5,490,274, 2/1996 to Zbikowski et al.
U.S. Patent No. 5,555,404, 9/1996 to Torbjornsen et al.
U.S. Patent No. 5,592,625, 1/1997 to Sandberg
U.S. Patent No. 5,713,002, 1/1998 to Zbikowski et al.
U.S. Patent No. 5,727,150, 3/1998 to Laudon et al.
U.S. Patent No. 5,771,383, 6/1998 to Magee et al.
U.S. Patent No. 5,784,697, 7/1998 to Funk et al.
U.S. Patent No. 5,805,593, 9/1998 to Busche et al.
U.S. Patent No. 5,862,338, 1/1999 to Walker et al.
U.S. Patent No. 5,864,851, 1/1999 to Breitbart et al.

UNITED STATES PATENT AND TRADEMARK OFFICE
CERTIFICATE OF CORRECTION

PATENT NO. : 5,974,536

DATED : October 26, 1999

INVENTOR : John L. Richardson

It is certified that an error appears in the above-identified patent and that said Letters Patent is hereby corrected as shown below.

-Catanzaro, Multiprocessor System Architectures: A Technical Survey of Multiprocessor/Multithreaded Systems Using SPARC®, Multilevel Bus Architectures, and Solaris® (SunOS)™, Sun Microsystems, Inc., 1994, pp. ii-xxxii and 1-319.

-Chandra, R. et al., "Data Distribution Support on Distributed Shared Memory Multiprocessors," to appear in *Proceedings of the SIGPLAN 97 Conference on Programming Language Design and Implementation*, Las Vegas, NV, June 1997.

-Coulouris et al., Distributed Systems: Concepts and Design, Second Edition, Addison-Wesley Publishing, 1994 (entire book provided).

-Coxeter, H.S.M., Regular Polytopes, 3rd Edition, Dover, 1973 (entire book provided).

UNITED STATES PATENT AND TRADEMARK OFFICE
CERTIFICATE OF CORRECTION

PATENT NO. : 5,974,536

DATED : October 26, 1999

INVENTOR : John L. Richardson

It is certified that an error appears in the above-identified patent and that said Letters Patent is hereby corrected as shown below.

-Goodheart, B. and Cox, J., <u>The Magic Garden Explained: The Internals of UNIX System V Release 4, An Open Systems Design</u>, Prentice-Hall, 1994 (entire book provided).

-Hennessy and Patterson, <u>Computer Architecture: A Quantitative Approach</u>, Second Edition, Morgan and Kaufman Publishing, 1996, pp. ix-xii and 634-760.

-Hwang, K., <u>Advanced Computer Architecture: Parallelism, Scalability, Programmability</u>, McGraw-Hill, 1993 (entire book provided).

-Kumar *et al.*, <u>Introduction to Parallel Computing</u>, Benjamin Cummings Publ., 1994, pp. v-xii and 29-48.

-Lenoski, D. and Weber, W.D., <u>Scalable Shared-Memory Multiprocessing</u>, Morgan Kaufmann Publishers, 1995, pp. xi-xv, 1-40, 87-95, 143-203 and 311-316.

-"A Smaby Group Strategic Analysis: SGI/CRAY Link Up For The Next Challenge," Smaby Group, Inc., 1996, pp. 1-6, printed from *http://www.smaby.com/sgicray.html* on April 16, 1997.

UNITED STATES PATENT AND TRADEMARK OFFICE
CERTIFICATE OF CORRECTION

PATENT NO. : 5,974,536

DATED : October 26, 1999

INVENTOR : John L. Richardson

It is certified that an error appears in the above-identified patent and that said Letters Patent is hereby corrected as shown below.

On the title page, in item [45], please replace "Oct. 26, 1999" with --*Oct. 26, 1999--.

On the title page, between items [73] and [21], please insert the following:

--[*]   Notice:   This patent issued on a continued prosecution application filed under 37 CFR 1.53(d), and is subject to the twenty year patent term provisions of 35 U.S.C. 154(a)(2).--

Signed and Sealed this

Sixth Day of March, 2001

Attest:

NICHOLAS P. GODICI

Attesting Officer

Acting Director of the United States Patent and Trademark Office